United States Patent [19]

Toews

[11] Patent Number: 5,662,210
[45] Date of Patent: Sep. 2, 1997

[54] FOLDING APPARATUS FOR TRANSPORTING PARTICULATE MATERIAL

[75] Inventor: Robert J. Toews, Winkler, Canada

[73] Assignee: Commercial Welding Ltd., Winkleo, Canada

[21] Appl. No.: 619,183

[22] Filed: Mar. 21, 1996

[51] Int. Cl.[6] .................................................. B65G 21/10
[52] U.S. Cl. ........................................ 198/632; 198/581
[58] Field of Search ................................ 198/581, 632, 198/589, 592, 861.3, 861.5

[56] References Cited

U.S. PATENT DOCUMENTS

| 289,442 | 12/1883 | Palmer | 198/632 |
|---|---|---|---|
| 1,027,505 | 5/1912 | Rosenthal | 198/632 |
| 1,190,564 | 7/1916 | Lindsay | 198/581 |
| 1,297,852 | 3/1919 | Hudzinski | 198/581 |
| 1,574,164 | 2/1926 | Oppenheim | 198/632 |
| 3,770,101 | 11/1973 | Carlson | 198/632 |
| 4,427,105 | 1/1984 | Hawley et al. | 198/632 |

FOREIGN PATENT DOCUMENTS

| 2257407 | 1/1993 | United Kingdom | 198/632 |

Primary Examiner—James R. Bidwell
Attorney, Agent, or Firm—Adrian D. Battison; Murray E. Thrift

[57] ABSTRACT

A conveyor for particulate material of the type including a tube with a belt running through the tube and defining a return run of the belt outside the tube provides a folding action by which the length of the tube can be reduced by folding an upper portion back against a lower portion. The folding action is actuated by a hand crank which drives a chain wheel connected to a pivot pin carrying the upper portion. The pivot pin is mounted to one side of the tube which is opposite to the return run of the belt. In order to provide an extension portion of the return run which can be released to provide the length necessary for the folding action, the return run passes over a pair of rollers to form a serpentine section of the return run at the fold line of the tube. Each of the rollers is carried on a respective one of the upper and lower portions on opposite sides of the fold line to release the serpentine portion as the folding action is effected.

14 Claims, 5 Drawing Sheets

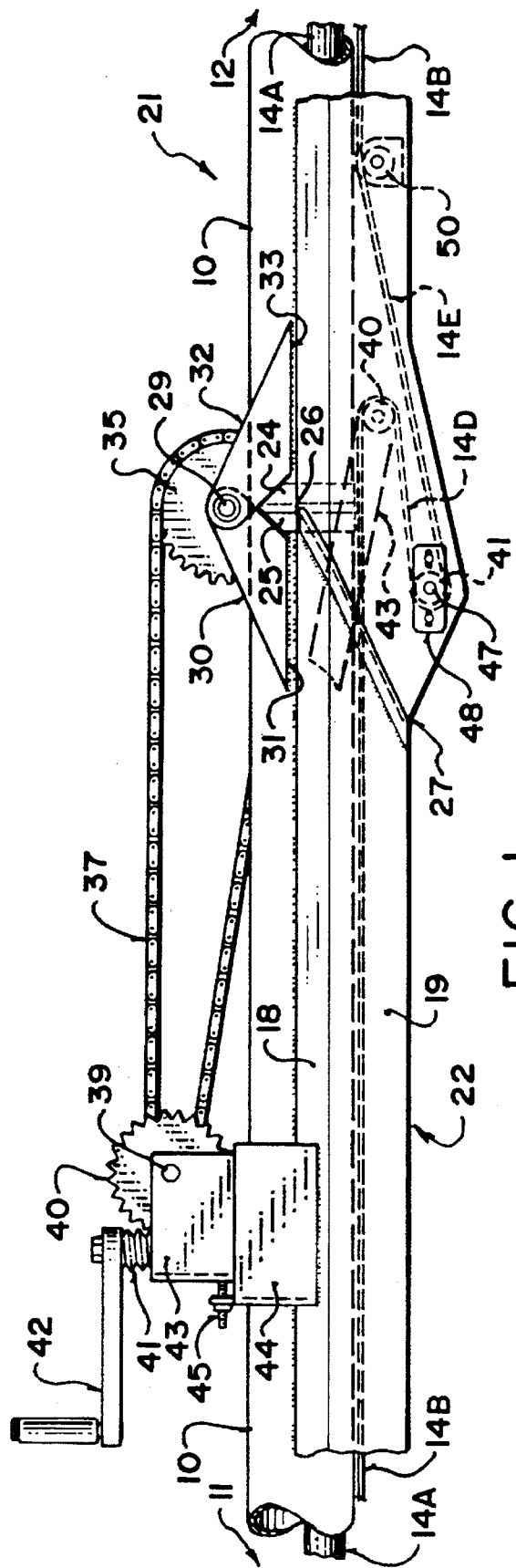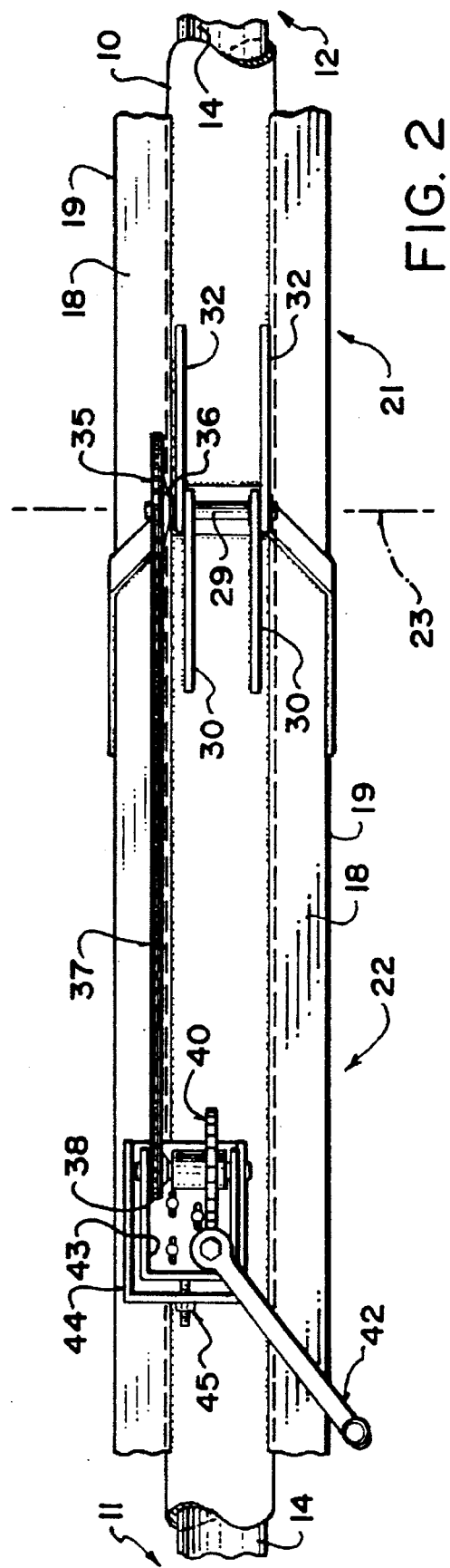
FIG. 1
FIG. 2

FOLDING APPARATUS FOR TRANSPORTING PARTICULATE MATERIAL

BACKGROUND OF THE INVENTION

This invention relates to an apparatus for transposing particulate material of the type comprising a tube through which one belt run of an endless belt passes so that particulate material is carried through the tube by the moving belt. Such transportation apparatus are well known and many examples have been manufactured and are described in the literature.

However one particular problem arises in relation to apparatus of this type in regard to providing a folding action so that the tube can be folded back with one potion lying alongside a second portion generally for transportation. This problem particularly but not exclusively arises in relation to discharge tubes for discharging materials from a transportation container in that the discharge tube must extend to a particular height or location for effecting the discharge action but during transportation of the container it is necessary to fold back the tube so that its length is reduced.

In many discharge devices of this type, an auger is used within the tube for transposing material and the folding action of this type of transposing apparatus can be relatively easy by breaking the drive shaft of the auger flight at the fold position.

However some materials require more delicate handling and hence cannot accommodate the vigorous action provided by the auger flight. Such materials therefore require the belt transportation system.

Up till now it is believed that no arrangement has been provided for folding a belt type transportation apparatus.

SUMMARY OF THE INVENTION

It is one object of the present invention, therefore to provide an improved belt type transportation apparatus for particulate material which allows a folding action.

According to one aspect of the invention there is provided a folding apparatus for transporting particulate material comprising: a tube having a feed end and a discharge end; an endless belt having a first belt run and a second belt run with the first belt run passing through the tube and the second belt run passing along the tube outside the tube such that the first run can carry materials through the tube from the feed end to the discharge end; guide means at the feed end and discharge end around which the belt is wrapped; and hinge means for folding the tube from an initial operating position about an axis transverse to the tube and generally parallel to the first and second belt runs such that one portion of the tube on one side of the hinge means can fold back to a folded position in which said one portion lies generally alongside a second portion of the tube on an opposed side of the hinge means.

Preferably the hinge means is arranged such that one of the first and second belt runs is extended relative to the initial operating position by folding around the axis to form an extension portion which is released when the tube is returned to the initial operating position and wherein there is provided take up means for taking up the extension portion.

BRIEF DESCRIPTION OF THE DRAWINGS

One embodiment of the invention will now be described in conjunction with the accompanying drawings in which:

FIG. 1 is a side elevational view of apparatus according to the present invention showing the tube in the initial operating position and showing only a centre part of the tube adjacent a hinge for a folding action.

FIG. 2 is a top plan view of the portion of the apparatus of FIG. 1.

In the drawings like characters of reference indicate corresponding parts in the different figures.

DETAILED DESCRIPTION

Figure 3:
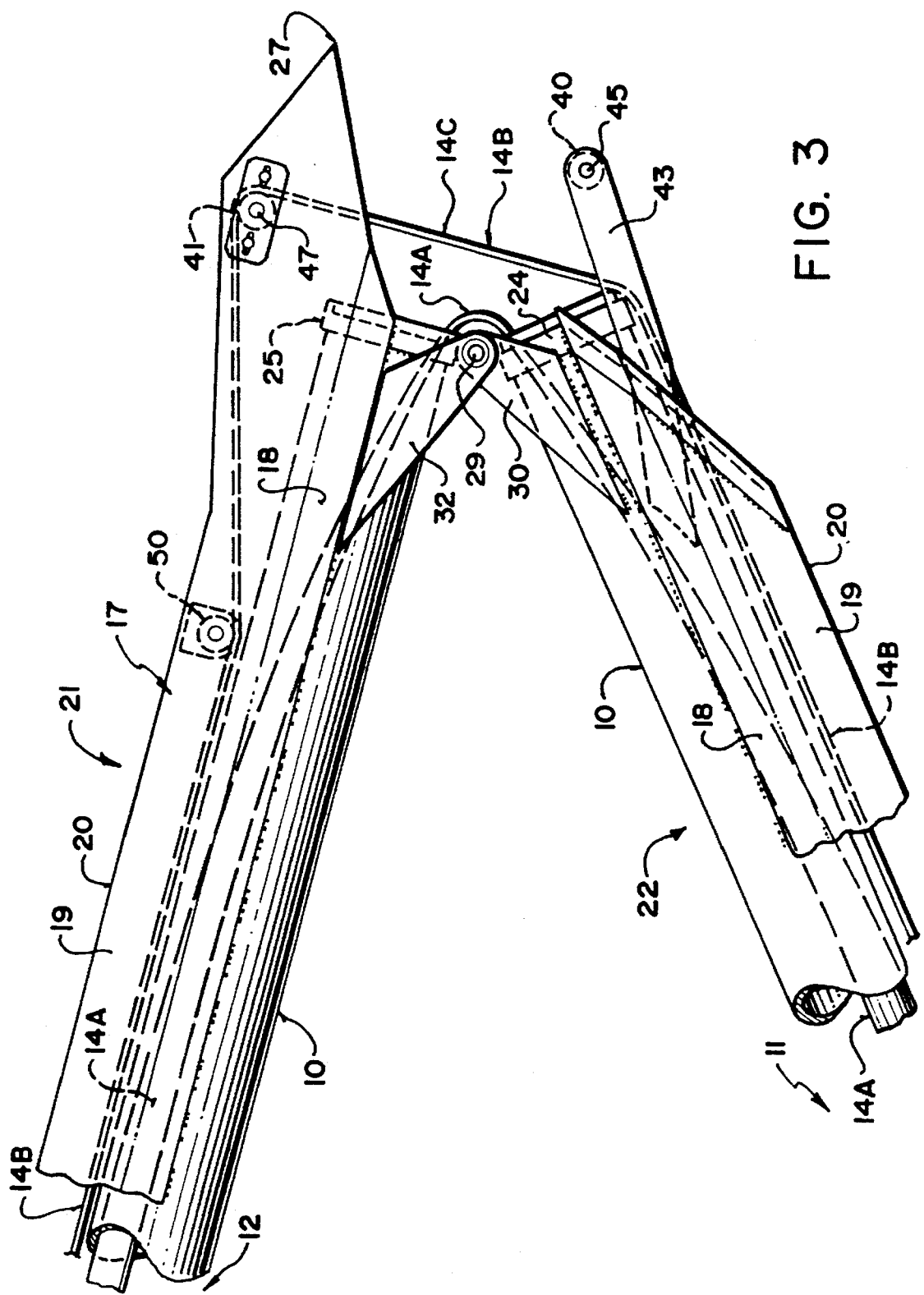
FIG. 3 is a side elevational view of the portion of the apparatus of FIG. 1 showing the apparatus in the folded position.

The apparatus for transporting particulate material is shown in one embodiment in the drawings FIGS. 1 through 6 and comprises a cylindrical tube 10 having a feed end 11 and a discharge end 12 for transporting particulate material from the feed end to the discharge end. In general, the tube will likely be inclined from a lower feed end to a raised discharged end but this is not necessarily the situation in all embodiments.

Figure 5:
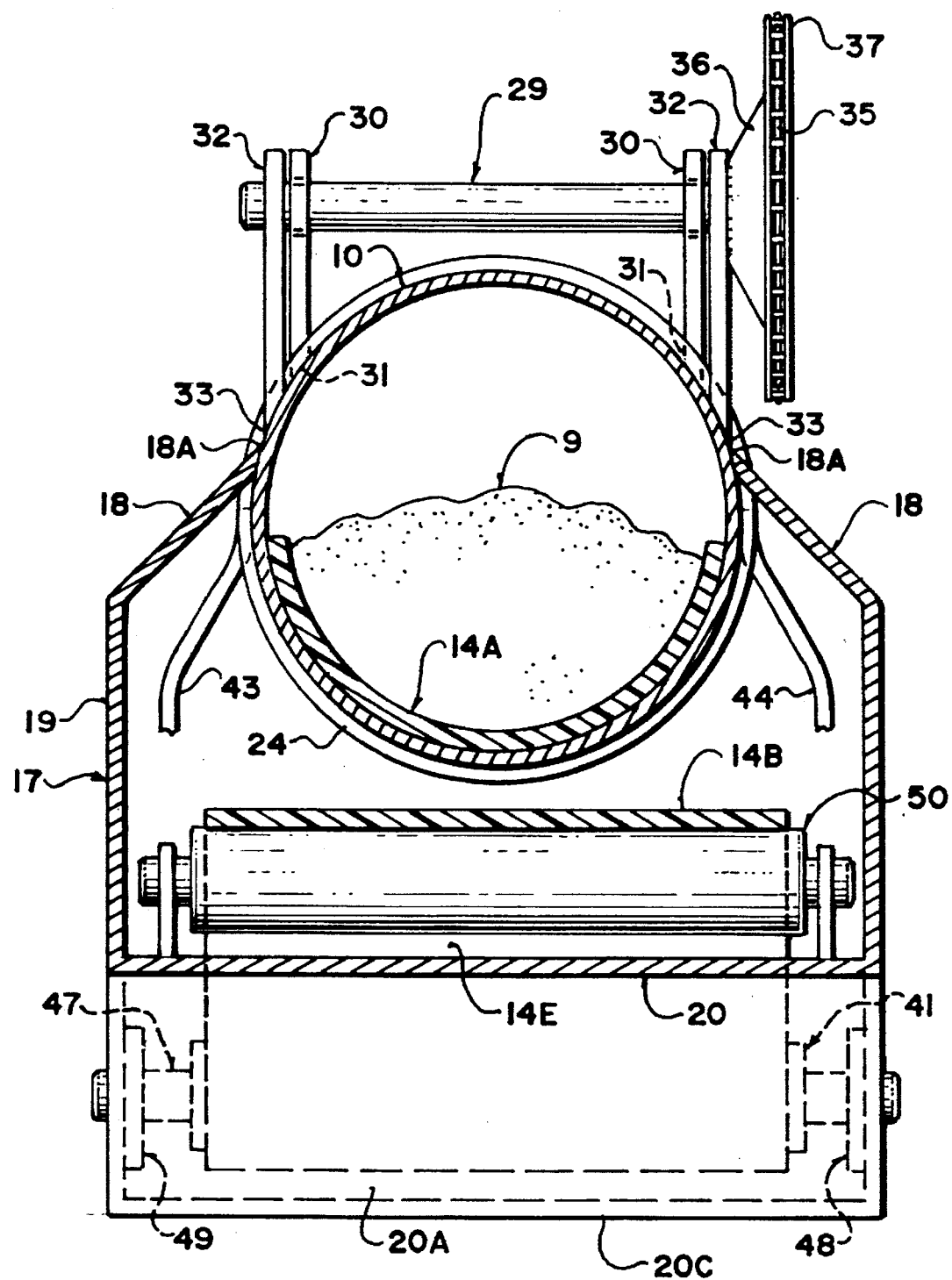
FIG. 5 is a cross sectional view along the lines 5—5 of FIG. 4.
Figure 6:
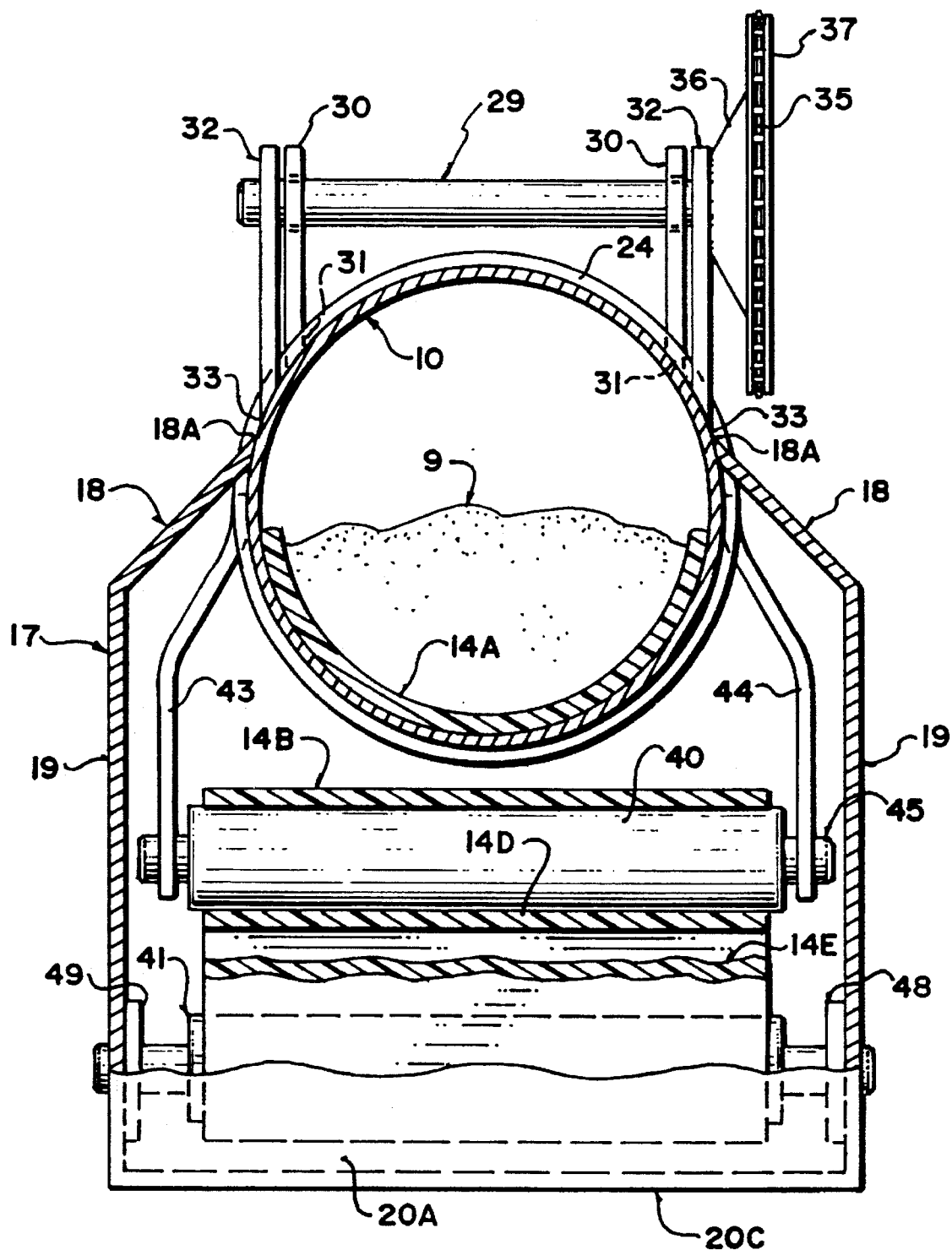
FIG. 6 is a cross sectional view along the lines 6—6 of FIG. 4.

The apparatus further comprises a flexible belt 14 having an upper belt run 14A and a lower belt run 14B. At each of the feed end and discharge end, the belt wraps around a roller 15, 16 respectively so as to form the belt into a continuous or endless belt which moves in the upper belt run 14A through the inside of the tube and through the lower or return belt run 14B downwardly along the outside of the tube. The width of the belt is greater than the diameter of the tube so that the belt lies across a bottom part of the tube as best shown in FIG. 5 and follows approximately the curvature of the tube. Outside the tube, the belt run 14B lies generally flat since it is not constrained by the curvature of the tube itself.

In conventional operation of a transportation apparatus of this type, particulate material is discharged onto the belt at a portion of the belt exposed at the feed end of the tube, is transported through the tube while supported by the upper surface of the belt and is discharged at the upper end of the tube as the belt wraps around the roller 16. As best shown in FIG. 5, in this embodiment the second run 14B of the belt is housed within a container 17 which is attached to the tube 10 and extends along the full length of the tube 10 so that the belt is protected and so that the belt is prevented from interfering with persons or equipment in the area of the apparatus. The container 10 includes two downwardly and outwardly inclined sidewalls 18 which are welded to the outside surface of the tube at a position above the mid height of the tube. At the outside edge of the walls 18 is defined a pair of depending walls 19 which extend vertically downwardly to a horizontal base wall 20. The width of the base wall 20 and thus the space in between the side walls 19 is greater than the width of the belt 14. The height of the side wall 19 is arranged so that it is sufficient to provide a reasonable space within which the belt runs. If preferred, the belt can be supported on rollers mounted in the container 17 so as to support the belt away from the base wall 20. In the arrangement as shown, the belt 20 runs against the base wall in some areas and is supported on rollers in some areas as described hereinafter.

The tube 10 and the container 17 together with the belt mounted therein is a conventional arrangement and is well known for transporting materials.

The improvement of the present invention relates to the folding device by which the tube can be broken at a point along its length defining an upper portion 21 and a lower portion 22 which can be pivoted about a hinge line so that the upper portion 21 can be folded back to lie generally alongside the lower portion as best shown in FIG. 3.

Figure 4:
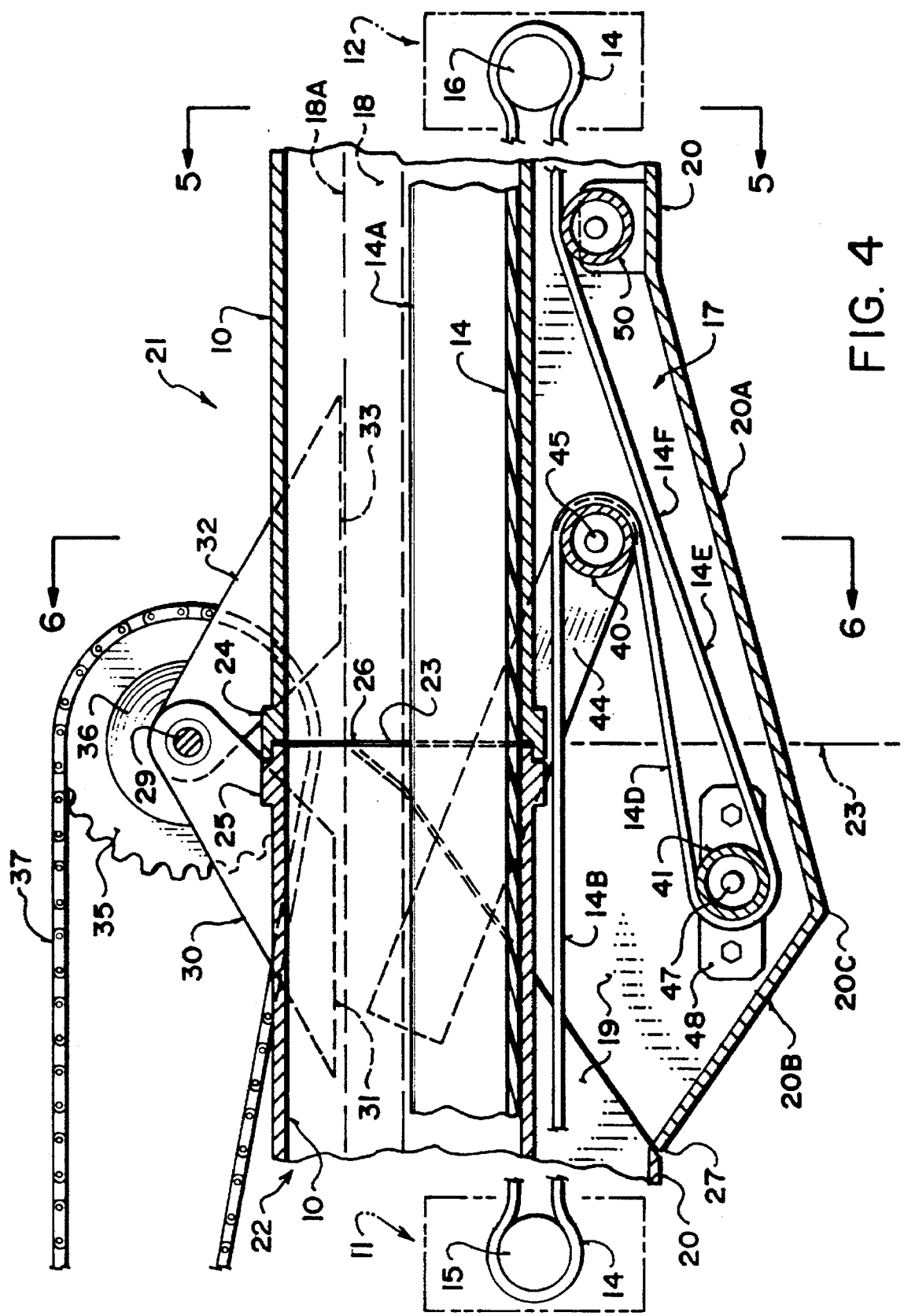
FIG. 4 is a longitudinal vertical cross section through the apparatus of FIG. 1 showing only the hinge area.

Thus the tube 10 is divided at a line 23 which is directly at right angles to the axis of the tube so as to form two butting ends of the tube when in the position shown in FIG. 4. The tube can be stiffened by a pair of stiffening rings 24 and 25 welded around the tube at the butting ends.

The container 17 is also divided into two sections but instead of the dividing line being arranged at right angles to the axis of the tube, the dividing line extends at an angle from an upper end 26 to a lower end 27 spaced to one side of the line 23. The upper end 26 lies on the line and is located at the junction between the upper edge 18A of the portion 18 of the container.

The hinging action of the upper portion 21 relative to the lower portion 22 is effected about a pin 29 defining an axis of rotation of the upper portion. The pin is offset to one side of the tube with that side being opposite to the container 17. The pin lies in the plane containing the line 23 and is at right angles to the axis of the tube. The pin 29 is mounted for rotation on a pair of upstanding lugs 30 welded to the lower portion 22 adjacent the line 23. The lugs are at right angles to the pin and are parallel and are welded at a bottom edge 31 to the outside surface of the tube 10. The pin 29 is attached to a similar pair of lugs 32 which extend from the pin downwardly and away from the line 23 and are welded similarly to the surface of a tube 10 at a weld line 33. The lugs 32 are spaced outwardly of the lugs 30. Thus rotation of the pin 29 about its axis within the bearings defined by the lugs 30 causes rotation of the lugs 32 and the upper portion 21 of the tube 10 carried thereby to effect the movement from the position shown in FIG. 1 to the position shown in FIG. 3.

The rotation of the pin 29 is effected by a chain wheel 35 which has a hub 36 welded to the pin and to one of the lugs 32. The chain wheel lies in a radial plane of the axis of the pin 29 and is located at one end of the pin 29. The chain wheel 35 is driven by a chain 37 from a sprocket 38. The sprocket 38 is mounted on a shaft 39 which is in turn driven by a worm and wheel system including a wheel 40 and a worm 41. The worm 41 is attached to a manual crank 42 such that rotation of the worm 41 about a vertical axis within a container 43 causes rotation of the wheel 40 thus driving rotation of the chain wheel 35 and causing movement of the upper portion between the extended and folded positions. The container 43 is mounted on the tube in a support bracket 44 with an adjustment turnbuckle 45 effecting sliding movement of the container 43 for tensioning the chain 37.

As it will be seen by comparing the position shown in FIGS. 1 and 3, the movement to the folded position shown in FIG. 3 causes a significant extension in the lower belt run 14B since the lower belt run must extend around the outside of the tube around the bands 24 and 25 of the tube. As the belt is not extensible, this extension portion 14C must be taken up as the tube is returned to the operating position shown in FIGS. 1 and 4.

For this purpose is provided a pair of guide rollers 40 and 41. The roller 40 is carried on the lower portion 22 of the tube and is carried by that portion so as to be located at a position beyond the line 23 and just outside the wall of the tube 10. The roller 41 is carried by the portion 21 and is again located beyond the line 23 relative to that portion.

Thus each of the rollers 40 and 41 is spaced from the line 23 by approximately the same distance and they range on opposite sides of the line. The roller 41 is however mounted so that it spaced further from the wall of the tube. This arrangement of the rollers as shown best in FIG. 4 provides a serpentine section of the belt run 14B which wraps around roller 40 forming a return section 14D of the belt and then wraps around 41 to form a further return section 14E of the belt. The section of the belt defined by the portion 14D and the portion 14E up to a point approximately indicated at 14F defines the extension portion 14C of the belt.

As the roller 41 is mounted outwardly from the tube by a further distance than the roller 40, as the tube is moved into the folded position shown in FIG. 3, the roller 41 moves outwardly around the roller 40 so as to gradually release the extension portion 14C as the roller 41 moves gradually past the roller 40 to take up the position shown in FIG. 3.

The roller 40 is mounted on a pair of arms 43 and 44 which are welded to the outside surface of the tube 10 approximately at its mid height and extends from the tube in an inclined direction downwardly and forwardly to the position beyond the line 23. The arms carry suitable mounting shaft 45 for the roller so that the roller is rotatable on the shaft by suitable bearings (not shown).

In the embodiment shown, the roller 41 is carried on a shaft 47 which is mounted on a pair of brackets 48 and 49 mounted on the side wall of the container 17. As the roller is mounted at a position below the base wall 20 of the container, an extension portion of the container is provided at the area of the fold and defined by two inclined base wall portions 20A and 20B which incline downwardly to an apex 20C at the roller 41. The side walls 19 are similarly extended so as to join with the edges of the base portions 20A and 20B. Thus the roller 41 is carried with the portion 21 of the tube but is attached to the container 17 of that portion rather than to the tube itself.

The arms 43 and 44 are bent outwardly as they extend from the tube wall toward the roller so as to allow the belt to pass between the arms in the operating position shown in FIG. 4 and to slide up inside the arms to engage the rib 24 on the end of the tube in the folded position shown in FIG. 3. As also shown in FIG. 3, the belt remains engaged around the roller 41 in the folded position so that it is held out away from the rib 25 of the tube. The upper or inner run 14A of the belt remains inside the tube and simply slides up to engage the ribs 24 and 25 at their positions adjacent the hinge pin 29.

In this way actuation of the crank 42 moves the upper or outer part 21 of the tube between the operating and folded positions and automatically maintains the belt in properly controlled position in view of the fact that the extension portion necessary for the folding action is controlled in its movement by the rollers 40 and 41.

An additional roller 50 is mounted on the base 20 at the connection between the base 20 and the base portion 20A so as to support the run 14B of the belt at that area and to prevent its rubbing vigorously against the junction between the base portion 20A and the base wall 20.

In an alternative arrangement (not shown), the container 17 can be omitted so that the belt run 14B is exposed on the outside of the tube. In this arrangement, the roller 41 can be mounted on arms similar to the arms 43 and 44 with those arms being bent further outwardly to engage 25 around the arms 43 and 44 when in the overlap position shown in FIGS. 1 and 4.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A folding apparatus for transporting particulate material comprising:

a tube having a feed end and a discharge end;

an endless belt having a first belt run and a second belt run with the first belt run passing through the tube and the second belt run passing along the tube outside the tube such that the first run can carry materials through the tube from the feed end to the discharge end;

guide means at the feed end and discharge end around which the belt is wrapped;

and hinge means for folding the tube from an initial operating position about an axis transverse to the tube and generally parallel to the first and second belt runs such that one portion of the tube on one side of the hinge means can fold back to a folded position in which said one portion lies generally alongside a second portion of the tube on an opposed side of the hinge means;

wherein the hinge means is arranged to one side of the tube opposite the second belt run such that the second belt runs is extended relative to the initial operating position by folding around the axis to form an extension portion which is released when the tube is returned to the initial operating position;

and wherein there is provided take up means for taking up the extension portion comprising a first belt guide member carried on the first tube portion adjacent the hinge means and a second belt guide member mounted on the second tube portion adjacent the hinge means with the belt wrapped around the first and second belt guide members such that, in the initial operating position, the first and second guide members take up the extension portion.

2. The apparatus according to claim 1 wherein each of the guide members comprises a roller.

3. The apparatus according to claim 1 wherein the first guide member is carried on a pair of arms attached to the first portion and extending therefrom to a position beyond the hinge means.

4. The apparatus according to claim 3 wherein the arms are spaced by a distance which is sufficient that the belt can pass between the arms.

5. The apparatus according to claim 1 including a cover channel mounted on the tube and extending therefrom to one side thereof and receiving the second belt run therein such that a second belt run is confined within the cover channel, the first guide member being mounted on the first portion of the tube and the second guide member being mounted on a portion of the cover channel carried by the second portion of the tube.

6. The apparatus according to claim 5 wherein the first guide member is mounted on a pair of arms extending from the tube within the cover channel and the second guide member is mounted on the cover channel.

7. The apparatus according to claim 6 including a receptacle portion defined on the cover channel and projecting outwardly therefrom with the second guide member being mounted therein.

8. A folding apparatus for transporting particulate material comprising:

a tube having a feed end and a discharge end;

an endless belt having a first belt run and a second belt run with the first belt run passing through the tube and the second belt run passing along the tube outside the tube such that the first run can carry materials through the tube from the feed end to the discharge end;

guide means at the feed end and discharge end around which the belt is wrapped;

a hinge for folding the tube from an initial operating position about an axis transverse to the tube and generally parallel to the first and second belt runs such that one portion of the tube on one side of the hinge can fold back to a folded position in which said one portion lies generally alongside a second portion of the tube on an opposed side of the hinge;

the hinge being arranged to one side of the tube opposite the second belt run such that the second belt runs is extended relative to the initial operating position by folding around the axis to form an extension portion which is released when the tube is returned to the initial operating position;

and take up means for taking up the extension portion comprising a first belt guide member carried on the first tube portion adjacent the hinge means and a second belt guide member mounted on the second tube portion adjacent the hinge means with the belt wrapped around the first and second belt guide members such that, in the initial operating position, the first and second guide members take up the extension portion;

the first guide member being mounted on the first portion and the second guide member being mounted on the second portion with the first and second guide members being arranged such that, in the initial operation position, the first guide member is located at a position beyond the hinge relative to the first portion and such that the second guide member is positioned beyond the hinge relative to the second portion with the belt wrapped around the guide members in serpentine manner such that the extension portion is supported thereby.

9. The apparatus according to claim 8 wherein the first guide member is carried on a pair of arms attached to the first portion and extending therefrom to a position beyond the hinge.

10. The apparatus according to claim 9 wherein the arms are spaced by a distance sufficient that the belt can pass between the arms.

11. The apparatus according to claim 8 including a cover channel mounted on the tube and extending therefrom to one side thereof and receiving the second belt run therein such that a second belt run is confined within the cover channel, the first guide member being mounted on the first portion of the tube and the second guide member being mounted on a portion of the cover channel carried by the second portion of the tube.

12. The apparatus according to claim 11 wherein the first guide member is mounted on a pair of arms extending from the tube within the cover channel and the second guide member is mounted on the cover channel.

13. The apparatus according to claim 12 including a receptacle portion defined on the cover channel and projecting outwardly therefrom with the second guide member being mounted therein.

14. A folding apparatus for transporting particulate material comprising:

a tube having a feed end and a discharge end;

an endless belt having a first belt run and a second belt run with the first belt run passing through the tube and the second belt run passing along the tube outside the tube such that the first run can carry materials through the tube from the feed end to the discharge end;

first and second guides at the feed end and the discharge end respectively around which the belt is wrapped;

a hinge for folding the tube from an initial operating position about an axis transverse to the tube and generally parallel to the first and second belt runs such that one portion of the tube on one side of the hinge can fold back to a folded position in which said one portion lies generally alongside a second portion of the tube on an opposed side of the hinge;

the hinge being arranged such that one of the first and second belt runs is extended relative to the initial operating position by folding around the axis to form an extension potion around the hinge which is released when the tube is returned to the initial operating position and belt take up means arranged adjacent the hinge for contacting the extension portion of the belt, the belt take up means being arranged to contact and guide the belt at the extension portion when in the initial operating position and when in the folded position and when moving between the operating position and the folded position such that the belt and the extension portion are held continually substantially taut between said first and second guides without tensioning movement of the first and second guides.

* * * * *